Nov. 3, 1953 G. GOZZOLI 2,657,731
LUBRICATED ROTARY JOINT FOR TIRE-INFLATION
Filed Oct. 31, 1951 2 Sheets-Sheet 1

Patented Nov. 3, 1953

2,657,731

UNITED STATES PATENT OFFICE 2,657,731

LUBRICATED ROTARY JOINT FOR TIRE INFLATION

Giovanni Gozzoli, Bologna, Italy

Application October 31, 1951, Serial No. 254,180

4 Claims. (Cl. 152—417)

This invention relates to rotary joints and its principal object is to provide a joint adapted to be fitted on wheels of motor vehicles and particularly of lorries provided with a source of compressed air and adapted to be connected on one side with the inflating tube of the wheel tires and on the other side with the said compressed air source through some valve.

The object of the invention is to permit to connect the inside of the tire of a revolving wheel with a source of compressed air, when this is needed, even during the running of the vehicle, so as to keep the tires inflated at the right pressure.

Of course, the joints permit also, by the employment of known devices, such as for instance those described in the pending U. S. A. application Ser. No. 126,739 dated November 12, 1949, which has matured into Patent 2,633,889 dated April 17, 1953, to control at any time the pressure of the air in the tires.

The joint according to the invention is substantially a rotary joint comprising a fixed part and a rotary part, whereby these parts are always in air-tight contact between them, the tightness being guaranteed by spring means keeping these parts tightly pressed and by an oil film blown under the pressure of compressed air between the contacting fixed and rotating parts of the joint.

A further improvement of the joint according to the invention resides in a simple means employed for splash-lubricating all the parts of the joints which need lubrication, viz. even those parts that are subjected to remain dry.

Other objects and advantages of the invention will appear from the following description of an embodiment of a very simple and cheap and also very efficient rotary joint constructed according to the invention.

Figure 1:
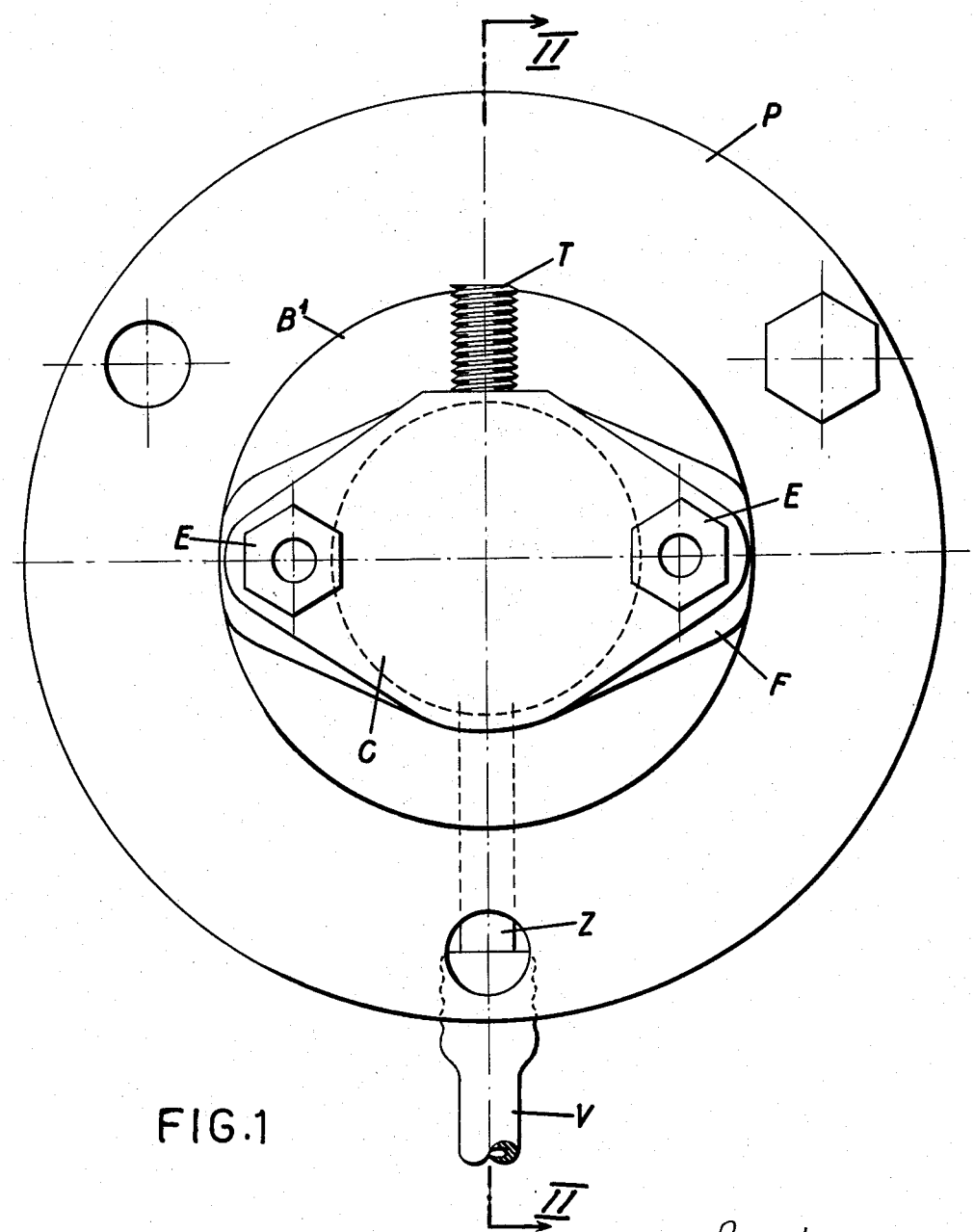
Figure 1 is a front view of the joint.

In the embodiment shown in the drawing, the joint comprises a fixed housing B—B¹ adapted to be fastened by means of flexible or telescoping attachment means (known per se and not shown) to the vehicle frame, or to a part integral thereto, and carrying the nipple T to be connected to the compressed air source and a rotatable body A—A¹—D which for the most part is rotatably supported with a fluid-tight fit within the other member B—B¹. The said rotatable body has a hub-like member D projecting out of enlarged part B¹ of the housing and carrying a plate P or like means for fastening the rotatable part of the joint to a wheel hub (not shown) and an air-outlet nipple Z to be connected to the inflating valved nipple of the wheel tire.

Housing B—B¹—B² comprises a cylindrical bearing part B whose inside diameter corresponds to the outer diameter of the rotating body A and a wider housing part B¹ adapted to contain oil and ending with a wall B² having a central bore lying with a tight fit against a shoulder S of body A—A¹. Thus the enlarged part B¹ of said housing, together with the corresponding part of the rotary body form a kind of annular chamber 4. The housing B—B¹—B² is closed at its outer or air-inlet end with a cover C carrying the air inlet nipple T and connected to flange F projecting out of housing part B by means of bolts E or other suitable fastening means.

The rotatable body comprises a cylindrical hollow part A closed by an axially bored bottom A¹ milled at its outer end so as to form a shoulder S and a hub or bearing D for the central bored part of wall B² of the housing B—B¹—B², both shoulder S and bearing hub D being milled so as to provide a tight fit with the corresponding parts of wall B². Beyond hub D a further shoulder is provided against which bears the fastening plate P which is held against rotation by suitable co-acting means, such as nose J projecting out of hub D and entering a notch cut into the bore of plate P. The outer part of hub D is screw-threaded and onto it a screw-threaded cap H is fitted which carries the radial nipple Z adapted to be connected to the usual inflating tube of the wheel tire. Between cap C and body part B and between the end of hub part D and the corresponding inside part of cap H, gasket rings G and G¹ are inserted.

Figure 2:
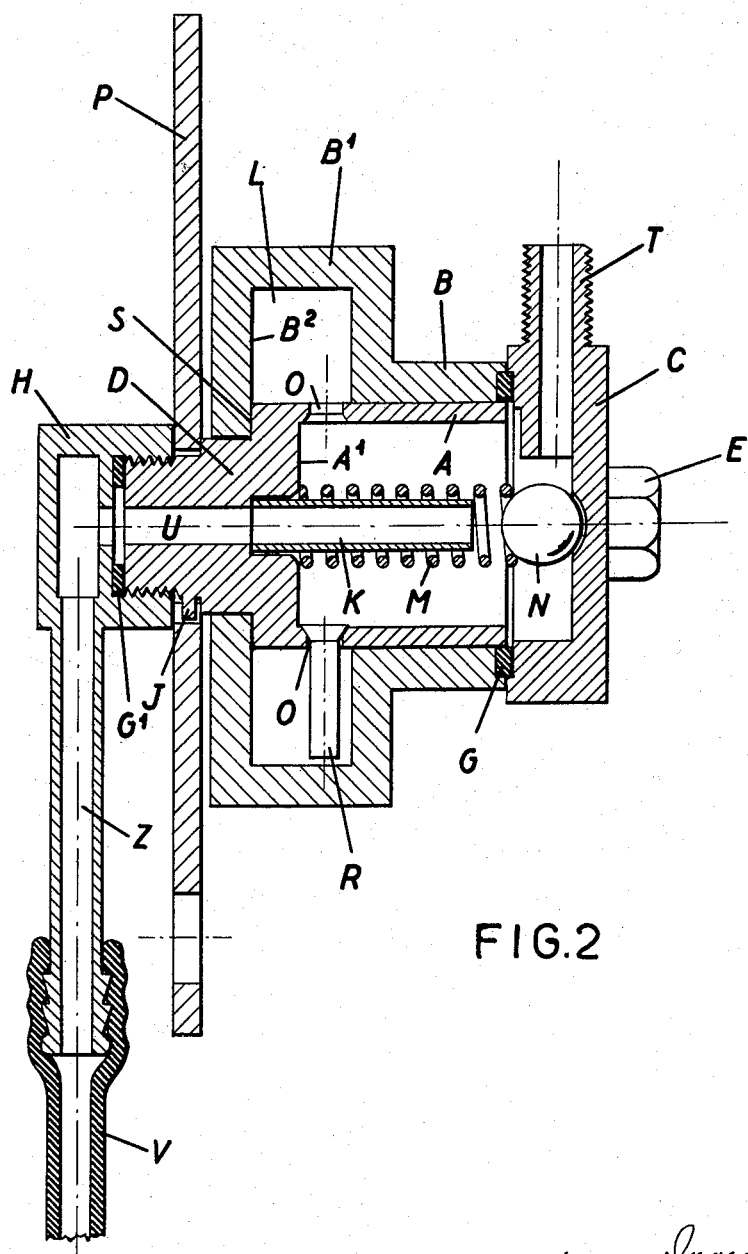
Figure 2 is a section on line II—II of Fig. 1.

In the hollow part of A, in correspondence of the enlarged housing portion B¹ a number of radial holes O are drilled through one (or more) of which a rivet R is inserted so as to project inside of the chamber formed within housing part B¹—B². As mentioned, bottom A¹ of part A is axially bored and, as shown in Figure 2, in the somewhat enlarged inner end of bore U a tubular projection K is inserted which serves as air conduit and as guide stem for a helical compression spring M bearing by one end against the bottom part A¹ of rotatable member A—A¹—D and by its other end, through a ball N bearing against a shallow cavity of cap C, against this cap which thus resiliently pushes the fixed part B² rigidly connected thereto against the shoulder S of rotatable part A—A¹—D.

The operation of the joint is as follows:

Once the chamber L filled in part with lubricating oil (the filling may be effected before mounting, by introducing the oil directly into said chamber, or after mounting, through air nipple T or even through some other nipple provided on part B[1]) nipple T is connected to the source of compressed air while nipple Z is connected as through flexible hose V to the usual valved nipple or air-inlet tube of the wheel tire. The part A by being rotated by way of its connection with plate P, carries along in rotation rivet R which by dipping into the oil collected at the bottom part of annular chamber L splashes a part of this oil all around the walls of said chamber. Any oil tending to flow on or into the part A is centrifugated against the part B. On the other hand, when compressed air is introduced through T, it tends to go out not only through U, but also through the joints between the parts B[2] and S, and as in chamber L there is oil, it will tend to press this oil into all joints existing in this chamber. This is equivalent to lubricating under pressure all joints and at the same time to provide an oil seal which does not permit of air leaking to the outside.

From the foregoing it is apparent that a very simple and efficient rotary joint has been provided, which is particularly useful for permitting of feeding compressed air into vehicle tires, and particularly into heavy vehicle tires, even during the running of the vehicle. This permits also of compensating small air losses of heavy vehicle tires, without being compelled to change immediately the wheels having slightly leaking tires, this operation being better effected with unloaded vehicle in a garage or a good service station.

Of course joint according to the invention may be embodied in a number of equivalent ways, all based on the idea of providing an efficient lubrication under pressure between the fixed and rotary parts of the valve and by utilising this lubricating means also as liquid seal for the air under pressure, which thus co-operates to establish a good lubrication and an efficient seal.

I claim:

1. A rotary joint comprising a fixed housing having a cylindrical bore closed at one end and an enlarged hollow part at the other end, a tubular nipple attached to the closed end of the bore, a hollow cylindrical body rotatably mounted within said housing and having a fluid-tight fit with the cylindrical bore of said housing and with the end of the enlarged hollow part, a bottom closing one end of said body and ending with a projecting part outside of said housing, a substantially axial bore through said bottom, a nippled cap tightly fitted at the end of said projecting part of said body, means for fastening said body to the hub of a vehicle wheel provided with tires, means connecting the said nipple of the housing to a source of a compressed air, means connecting the nipple connected to the rotary body to a valved tire-inflating tube, and communication means between the hollow part of the rotary body and the enlarged hollow part of said housing whereby said enlarged hollow part, together with the periphery of the rotary body forms an annular chamber into which oil can be introduced so as to lubricate, and under air pressure effect an oil seal of the joints between the rotary body and the fixed housing.

2. A rotary joint as claimed in claim 1 in which the communication between the hollow part of the rotary body and the said annular chamber is effected by means of a number of radial holes provided near the bottom of said rotary body, and at least one of said holes slidably retaining a rivet-like member projecting radially into said annular chamber and promoting a splash lubrication of all the joints between fixed and rotary parts of said chamber during rotation of said rotary body.

3. A rotary joint comprising an outer housing having a cylindrical bore and a wider hollow part on one side of the said bore, a cylindrical body within said housing, said body comprising a part of larger diameter rotatably mounted with a fluid-tight fit in said cylindrical bore and said wider hollow part of said housing and comprising further a part of lesser diameter projecting out of said housing, a chamber opened at one end in said cylindrical body, a bore located axially through the bottom of said chamber, radial holes through the walls of said chamber opening into said enlarged part of said housing, said enlarged part forming together with said cylindrical body an annular chamber to be filled in part with oil and communicating with the interior of the chamber within said cylindrical body through said radial holes, an annular shoulder between the parts of larger and lesser diameter of said cylindrical body and co-acting with a corresponding part of the wall of said annular chamber to establish a tight fit between these parts and preventing said body sliding in one direction, a short tube projecting outwardly of the axial bore into the chamber of said cylindrical body, a cap provided with a tubular nipple fluid-tightly fastened to said housing, a helical spring fitted on said short tube and bearing on one end against the bottom of said last mentioned chamber and on the other end against a rotatable member, said rotatable member in turn bearing against the inside of said cap, and a second cap fitted on the projecting end of lesser diameter of the cylindrical body, said second cap being provided with a tubular nipple adapted to be connected to the inflating tube of a wheel tire and means for fastening the projecting part of said body to the hub or other rotatable part of a vehicle wheel.

4. A rotary joint as claimed in claim 3, in which through one of the radial holes of said cylindrical body a rivet or the like is inserted so as to project in part into the said annular chamber.

GIOVANNI GOZZOLI.

References Cited in the file of this patent

UNITED STATES PATENTS

| Number | Name | Date |
|---|---|---|
| 392,032 | Jacobson | Oct. 30, 1888 |
| 919,970 | Smith | Apr. 27, 1909 |
| 2,080,744 | Rogers | May 18, 1937 |
| 2,391,885 | Shields | Jan. 1, 1946 |